United States Patent [19]

Ugelstad

[11] Patent Number: 4,563,510

[45] Date of Patent: Jan. 7, 1986

[54] PROCESS FOR THE PREPARATION OF POLYMER LATEX

[75] Inventor: John Ugelstad, Trondheim, Norway

[73] Assignee: Sintef, Trondheim, Norway

[21] Appl. No.: 573,605

[22] Filed: Jan. 25, 1984

Related U.S. Application Data

[63] Continuation-in-part of Ser. No. 91,492, Nov. 5, 1979, abandoned.

[30] Foreign Application Priority Data

Nov. 6, 1978 [NO] Norway .................................. 783717

[51] Int. Cl.$^4$ ................................................ C08F 2/24
[52] U.S. Cl. ........................................ 526/66; 526/80; 526/87
[58] Field of Search ....................... 526/65, 66, 80, 86, 526/87

[56] References Cited

U.S. PATENT DOCUMENTS 2,475,016  7/1949  De Nie .................................. 526/65

Primary Examiner—Paul R. Michl
Attorney, Agent, or Firm—Wenderoth, Lind & Ponack

[57] ABSTRACT

The invention provides a process for the preparation of polymer latex by emulsification of an initiator or initiator mixture and optionally a solvent in the presence of emulsifier in water in a first step and adding a monomer and polymerizing in a second step. The process is carried out by emulsifying an essentially water-insoluble initiator or initiator mixture in the first step at a temperature above the melting point of the initiator or initiator mixture if no solvent is used, and below its decomposition temperature, optionally together with an essentially water-insoluble liquid solvent, which forms a liquid solution together with the initiator or the initiator mixture at the emulsification temperature, then, in a second step adding monomer, possibly additional emulsifier and that part of the desired amount of water which was not added in the first step, and initiating polymerization as per se known by heating.

15 Claims, No Drawings

PROCESS FOR THE PREPARATION OF POLYMER LATEX

This is a continuation-in-part of U.S. application Ser. No. 91,492, filed Nov. 5, 1979, now abandoned.

Ordinary emulsion polymerization is carried out by adding monomer to a mixture of water and emulsifier and using a water soluble initiator. The order of mixing is not essential. The emulsifier forms micelles which are aggregates of about 100 molecules of the emulsifier and which are about 50 A in diameter. A very small part of the total monomer will be dissolved inside the micelles, while the major amount will be present as monomer droplets.

The initiator forms radicals in the aqueous phase. The radicals, which are water soluble, will diffuse through water into the micelles and start polymerization there.

The micelles are in that way transformed to polymer particles which grow by polymerization of the monomer which is gradually transported from the monomer droplets to the growing particles. The growth of the particles also leads to an increase in the surface. Emulsifier is steadily adsorbed to cover the surface and after only a few percent of the monomer has reacted, one reaches the critical micelle concentration where the micelles disappear. The system now consists of growing particles and monomer droplets which act as a reservoir for monomer which diffuses from the monomer droplets through the aqueous phase to the growing particles. Radicals to keep up the radical concentration in the growing particles are provided by the initiator dissolved in the aqueous phase which produces water soluble radicals capable of diffusing through the water to become absorbed in the particles. It is an essential point in ordinary emulsion polymerization processes that no polymerization takes place in the monomer droplets. All polymerization takes place in the growing polymer particles. The monomer droplets only act as a reservoir for monomer.

This mechanism of emulsion polymerization was first put forward by Smith and Ewart and forms the basis for the famous Smith-Ewart theory. The theory has been confirmed by a vast number of papers describing emulsion polymerization. The Smith-Ewart theory appeared in 1948.

It is easy to understand that it is not possible to carry out such a process with an oil soluble, highly water insoluble initiator. If an emulsion of such an initiator is made by stirring with emulsifier in water, large droplets (~10 μm) of the initiator will be obtained (if the initiator is liquid at the temperature used).

Radicals formed by decomposition of the initiator cannot possibly be transported from these droplets to the micelles containing monomer to start the polymerization there. On the contrary, in such a case it will be seen that the monomer will swell the droplets of initiator to form very large droplets, and polymerization leads to formation of a completely coagulated mass of polymer.

Also, if an oil soluble initiator which is at the same time water soluble is used, the process of an ordinary emulsion polymerization is difficult to perform. The initiator radicals may in this case possibly diffuse into the micelles and start polymerization there. However, the initiator as such may diffuse into the large monomer droplets and start polymerization there. The result is again a coagulated mass of polymer. The only way such a coagulation may be prevented in this case is by a very slow addition of monomer. Even such a method is not possible to carry out if a highly water insoluble initiator is used. The explanation of the emulsion polymerization mechanism was presented in 1948, as mentioned above.

In several patent specifications before that time dealing with modifications in the process for ordinary emulsion polymerization, it will be seen that although the applicant is dealing mainly with water-soluble initiators in the general text and only with water-soluble initiators in the examples, the specification and the claims also include reference to oil-soluble, highly water-insoluble initiators.

This deficiency was overlooked, because nobody knew the mechanism and that the use of oil-soluble, highly water-insoluble initiators was impossible. An example of such a patent is U.S. Pat. No. 2,475,016. Thus, the process of said patent is inoperative if water-insoluble initiators are used.

A lot of work has since then been done and has been published on methods which allow the use of oil-soluble initiators. Also several patents have issued describing such methods. They are all in principle different from ordinary emulsion polymerization, which has been recognized and accepted.

These methods are known as microsuspension processes. A general feature of these processes is that in order to overcome the difficulties described above, a mixture of monomer and the oil-soluble initiator is homogenized to obtain droplets in the range of 0.2–1 μm. To achieve this it is necessary to use very effective homogenizers, normally operating with high pressures. The necessity to homogenize the total amount of monomer and water was avoided in Belgian Pat. Nos. 851.556 and 857.919 which describe a method of preparing polymer latices wherein in a first step a mixture of a small amount of a water-insoluble, liquid solvent having a water-solubility of $<10^{-3}$, preferably $<10^{-4}$ and a relatively low molecular weight, called Substance I, together with water and emulsifier, is homogenized to prepare a stable emulsion of Substance I. To this emulsion there is added water, optionally more emulsifier and a vinyl monomer or mixture of vinyl monomers. The monomers, which are partly water-soluble, diffuse into and are absorbed in the drops of Substance I in the pre-emulsion. The polymerization is carried out with a water-soluble initiator or with an oil-soluble initiator being sufficiently water-soluble to diffuse through the aqueous phase and become absorbed in the drops of Substance I, just like the monomer. As Substance I is water-insoluble, the only transport which takes place through the aqueous phase into the drops of Substance I, is the transport of the slightly water-soluble vinyl monomers and possibly the slightly water-soluble initiator, of course in addition to radicals formed from water-soluble initiators. The fact that Substance I has a relatively low molecular weight, has the effect that the drops of Substance I may take up at least 100 times their own weight of the vinyl monomer, in contrast to polymer particles wherein the capacity for taking up monomer is limited to 0.5 to 5 times the weight of the polymer particles.

It has now been found that an oil-soluble initiator or a mixture of initiators may be used as Substance I, provided that this mixture is sufficiently water-insoluble as stated for Substance I, and is also in liquid form at the temperature used during the emulsification. In practice this means that it is advantageous to use initiators or initiator mixtures in which both or at least one has a relatively low melting point, in order to avoid having to emulsify at a temperature at which the initiators are unstable. Examples of initiators which combine low melting point and low water-solubility, are dioctanoyl peroxide, didecanoyl peroxide, dioctanoyl-peroxydicarbonate, didecyl-peroxydicarbonate, didodecyl-peroxydicarbonate having a water solubility $<10^{-4}$ g/l $H_2O$ and relatively low melting points. With most low melting initiators the situation is that they do not have sufficient water-insolubility to provide stable pre-emulsions with subsequent stable monomer emulsions upon diffusion of monomer.

After the preparation of the emulsion of initiator in the first step, water, optionally more emulsifier and vinyl monomer or vinyl monomers are added. The monomer diffuses into the initiator drops in the pre-emulsion, and a stable emulsion of the monomer is obtained. The polymerization is carried out in an ordinary manner by heating. It is an essential point that in this way the initiation takes place inside the monomer drops, so that the final latex particles have been formed directly from said drops and not through the formation of nuclei in the aqueous phase as in ordinary emulsion polymerization. The final latex particles will therefore attain a size and size distribution determined by the size and the size distribution of the monomer drops.

If it is assumed that after addition of water in the second step a total amount of water of 1000 g is present, and liquid initiator is used as the only water-insoluble substance during the preparation of the pre-emulsion in the first step, there is normally used an amount of water-insoluble initiator of 0.5–20 g, preferably 2–20 g and an amount of water of 2–200 g, preferably 10–200 g. The amount of monomer used in the second step normally varies between 500 and 2000 g. As emulsifier there may be used an anionic, cationic and/or non-ionic emulsifier. That part of the total amount of emulsifier added in the preparation of the pre-emulsion may be varied and can be used to adjust the drop size in the pre-emulsion and thereby the particle size in the final latex. The proportion by weight of emulsifier is suitably 1:1000–5:100, based on the total amount of water.

The preparation of the pre-emulsion may be carried out by using well known emulsification equipment such as a pressure homogenizer, colloid mill or ultrasound device. As described in example 6 and example 7 it is also possible to obtain a very fine dispersion of the initiator by ordinary stirring if a relatively large amount of non-ionic emulsifier is used.

In the preparation of the pre-emulsion of initiator one may, if desired, mix the initiator with another liquid Substance I which is not an initiator, but which satisfies the requirements with respect to water-insolubility and low molecular weight which has been described in Belgian Pat. No. 851.556. As described in said patent, said Substance I may be alkanes and chlorinated alkanes, ester-compounds, vinylmonomers. In practice it may be any organic material which is liquid at the homogenization temperature used in the first step and has a water-solubility less than $10^{-2}$, usually less than $10^{-3}$ and preferably less than $10^{-4}$ g/l $H_2O$. In said patent it is stated that the drops of Substance I should be capable of taking up at least a 100 times their own weight of monomer, which requires that it has a molecular weight <5000, preferably <500. With addition of this Substance I in addition to initiator in the preparation of the pre-emulsion in the first step, a larger number of drops may be obtained with the same emulsification conditions. This will have the effect that an increased absorption capacity for the monomer will be attained in the second step. With the same amount of monomer added in the second step, this will have the effect that the particles in the final latex will become smaller. With addition of Substance I one may also, if desired, reduce the amount of initiator used in the first step, without affecting the swelling capacity for monomer in the second step, which is provided by the sum of initiator and Substance I. The proportion by weight of the water-insoluble Substance I, if used, mixed with the initiator before the emulsification in the first step, will normally be in the range 0.05:1 to 10:1 based on the weight of the initiator, and the ratio between Substance I and water in the final latex, is then suitably 0.5:1000–5:100. The total weight of initiator and Substance I in proportion to water in the final latex, will normally be 3:1000 to 7:100. With Substance I, which according to the stipulated conditions is liquid at the temperature used during the emulsification, it is possible to carry out the emulsification at a temperature which is below the melting point of the initiator or the initiator mixture used, which increases the choice of useful initiators. An example of an initiator which in this case advantageously may be used if a relatively rapidly acting initiator is desired, is bis(4-tert.butylcyclohexyl)-peroxydicarbonate which may be used as the only initiator or admixed with other initiators. It is for instance possible to use a solution of bis(4-tert.butylcyclohexyl)-peroxydicarbonate in dioctanoyl-peroxydicarbonate.

It is however, emphasized that by using a water-insoluble initiator or initiator mixture being liquid at the emulsification temperature which is below the decomposition temperature of the initiators, it is not necessary to use any additive to prepare a pre-emulsion which in the second step can absorb monomer in a proportion 20:1 to 500:1, based on initiator.

The requirement that the initiators should have a high degree of water-insolubility applies to the same extent even when additionally using a Substance I which by itself would provide a sufficient degree of swelling with formation of a stable monomer emulsion. When adding monomer in the second step it may be desirable to add an excess of the amount taken up in the drops of the pre-emulsion. This will not be possible if the oil-soluble initiator has a certain solubility in water, since it will then rapidly distribute itself so that some of it will be absorbed in the bulk phase of monomer and result in undesired bulk polymerization. Further, it may be desirable to add monomer stepwise. This cannot be done with an oil-soluble, partly water-soluble initiator, since a bulk polymerization will be obtained even in this case. Further, for the same reason, it will not be possible to cool with refluxing monomer with an oil-soluble, partly water-soluble initiator, since in this case a stationary layer of monomer will be formed with bulk polymerization as result.

In DAS 2501630 there is described a process for preparing polymer latex of PVC, characterized by first preparing an emulsion of a solution of an oil-soluble initiator. From the description of said DAS it does not appear that neither initiator nor solvent must be water-insoluble. In the description there are mentioned several initiators and solvents which in combination will not provide a stable pre-emulsion suitable as basis for subsequent preparation of monomer emulsions, because neither initiator nor solvent are sufficiently water-insoluble.

In the examples there has been used a mixture of two water-insoluble initiators, lauroyl peroxide, LPO and dicetylperoxydicarbonate, DCPC, which are both solids at 50° C. In addition large amounts of partly water-soluble solvents, such as ethylene dichloride, methylene chloride or xylene have been used. It should be pointed out that none of these satisfy the requirements for water-insolubility referred to above for Substance I which may be used according to the present process. In the examples of DAS 2501630 the ratio between solvent and the sum of water-insoluble initators is 17:1. The amount of solvent in proportion to 1000 g of water in the final latex is 5:100. Because so much solvent is used, it is stated that there is preferably used a volatile solvent which will evaporate during the drying of the PVC latex.

Further, in DAS 2501630 it is stated that there is used an amount of said initiators LPO and DCPC of 2.4 and 0.6 respectively per 1000 g of water in the final latex, and in the examples all the water has been used during the preparation of the pre-emulsion. With such a small amount of water-insoluble substances, and with the fine distribution obtained with the large amount of solvent and emulsifier used, it is clear that this pre-emulsion is capable of taking up only a small part of the monomer, in the examples 800 g/1000 g $H_2O$, added in the second step.

It must be emphasized that the solvents used in said DAS are all slightly soluble in water, in the same order of magnitude as vinylchloride. The presence of these solvents in the pre-emulsion will therefore not increase the capacity for absorbing vinylchloride in the pre-emulsion drops.

On the contrary, the presence of a large amount of these solvents will as explained below lead to the production of a large number of drops each of which contains only a small amount of water-insoluble Substance I and the net effect will therefore be a reduced capacity for absorption of vinylchloride in the next step.

Further, a very large amount of emulsifier is used, in the examples 26.5 g of sodiumdodecylbenzene sulphonate per 1000 g of $H_2O$, all being added during the preparation of the pre-emulsion. The result will therefore be that the pre-emulsion will consist of fine drops which contain initiator+solvent and a large number of micelles which also contain solvent and initiator. Even after the swelling in the second step the critical micelle concentration will remain exceeded with the stated amount of emulsifier.

Experiments were carried out according to said DAS with ethylene chloride as solvent and with the same amounts and type of initiator and emulsifier as stated in the examples. The pre-emulsion was prepared by homogenization of 1000 g $H_2O$, 50 ml of ethylene dichloride, 2.4 g of LPO, 0.6 g of DCPC and 26.5 g of emulsifier Na-dodecyl-benzene sulphonate. In the homogenization, which was carried out in a two stage homogenizer under pressure conditions as stated, a slightly turbid emulsion was obtained. The drops were <0.1 $\mu$m. With the high amount of emulsifier, an essential part of the emulsifier will be present in the form of micelles in addition to small drops, and a substantial part of solvent with initiator will be solubilized in the micelles. The presence of ethylene dichloride in the drops in the pre-emulsion will as mentioned, not influence the capacity to absorb vinyl chloride in the second step, since ethylene dichloride has such a high solubility that there will be a rapidly established distribution of ethylene dichloride between drops in the pre-emulsion and vinyl chloride added in the second step. The swelling of a drop of a water-insoluble Substance I will be determined by the diameter of the drops and increase with increasing diameter. When, as stated in the examples of the DAS, there is present an amount of water-insoluble substance, i.e. initiators, which represent only 6% of the material in the drops, the effective diameter of the drops will be given by the diameter corresponding to 6% of the volume of the drops. Thus, the effective diameter is <0.04 $\mu$m. It is clear that such a small amount of water-insoluble substance as 3 g per 1000 g of $H_2O$ with such a small drop diameter, will be capable of absorbing only a very small fraction of the 800 g of VC added in the second step.

In order to confirm this, we have carried out experiments wherein 800 ml of ethylene dichloride or chlorobenzene were added to the above pre-emulsion. These substances were employed as model substance for vinyl chloride. This amount corresponds to a v/v ratio of about 15 between the amount of ethylene dichloride or chlorobenzene added and the organic material in the pre-emulsion. In the second step stirring was carried out with an ordinary blade stirrer at 250 rpm at 50° C. Analysis after stirring for $\frac{1}{2}$ hour and after 2 hours showed that added ethylene dichloride an chlorobenzene respectively were present primarily partly in drops having a diameter in the range 0.4 to 2.0 $\mu$m and partly as drops having a diameter from 4 to 10 $\mu$m. It is obvious that not even the smallest drops can have been formed by diffusion of ethylene dichloride or chlorobenzene into the drops from the pre-emulsion. In order for the drops in the pre-emulsion to increase their diameter to 0.4 to 2.0 $\mu$m due to about 15 times increase in volume, they must originally have had a diameter of from about 0.15 to 0.8 $\mu$m, and the majority would then have been clearly observable in an optical microscope. The drops formed in the second step are the result of a direct emulsification of ethylene dichloride and chlorobenzene respectively, added in the second step, and the obtained emulsion containing a considerable proportion as drops having a diameter in the range 0.4 to 2.0 $\mu$m, is due to the high content of emulsifier. This was illustrated by separate experiments where homogenization was left out and no initiator was present in the system. Also in the case without pre-emulsion, an emulsion containing a proportion of drops in the range 0.4 to 2 $\mu$m was formed. Centrifugation of the emulsion at 15,000 rpm for 30 minutes resulted in that more than 50% of added ethylene dichloride and chlorobenzene respectively coalesced during the centrifugation. After the centrifugation of the emulsion formed without preceding preparation of a pre-emulsion, a clear layer of coalesced ethylene dichloride, a layer of emulsified ethylene dichloride and an aqueous layer were present. In samples of the emulsion prepared from a pre-emulsion from the first step, a thin layer of a slightly turbid solution was present in addition. This is the original pre-emulsion which obviously to a very small extent has absorbed ethylene dichloride added in the second step.

Experiments were also carried out with a reduced amount of water, and an amount of emulsifier which is more in conformity with the amount which would be desirable in practice and more in conformity with the amount used according to the present invention. 2.4 g LPO, 0.6 g DCPC were dissolved in 15 ml of ethylene dichloride and were homogenized as described above with 200 g/l H₂O containing 7 g of Na-dodecyl-benzene sulphonate. An emulsion was formed which upon examination was found to contain drops in the range <0.15 μm. Then 800 ml of ethylene dichloride +800 ml of H₂O were added, and stirring was carried out in the usual manner at 50° C. as described above. In this case, with a much lower amount of emulsifier, the majority is found as drops in the range 2 to 10 μm. By centrifugation about 90% of the ethylene dichloride coalesced. The ability of the pre-emulsion to absorb ethylene dichloride or other slightly water-soluble substances in a subsequent step is therefore as expected, very low. The drops of the pre-emulsion absorb ethylene dichloride in a proportion lower than 10:1.

These experiments illustrate that in the examples described in DAS 2501630, the initiation of polymerization with formation of polymer particles will take place in micelles and drops formed by homogenization and which in the second step will be swelled with monomer only to a very minor extent. The monomer drops formed by emulsification of monomer added in the second step and which constitute the major proportion of added monomer, do not serve as centre of polymerization, but serve only as a reservoir of monomer which diffuse from the monomer drops through the aqueous phase into the growing particles. In this sense the method does not differ from ordinary methods for emulsion polymerization with oil-soluble initiator. The fact that the monomer drops formed during the emulsification in the second step, can not have been formed by diffusion of monomer into the drops from the pre-emulsion, will also appear from the fact that in that case all initiator would have been present in said drops, and initiation and polymerization would then take place therein. In that case it would be expected that the particles would have the same size and size distribution as the drops of monomer formed in the second step, i.e. about 0.3–1.5 μm (slightly less than the droplets due to shrinking during polymerization). However, the experiments show that the particles in the final latex had a mean size of 0.17 μm.

The method according to the present invention differs in all essential respects from the method described in DAS 2501630. In the method according to the present invention, it is an essential feature that the drops formed in the first step are capable of absorbing a major part of the monomer added in the second step. Thereby the surface of the drops increases, and then also the ability to adsorb emulsifier. It is an important feature that no micelles of initiator are present wherein polymerization can be initiated. The initiation takes place in monomer drops formed by swelling of pre-emulsion drops with monomer by means of their contents of initiator + optionally Substance I. The fact that the pre-emulsion is capable of taking up the majority of the monomer added in the second step has been shown by separate swelling experiments with the pre-emulsions with ethylene dichloride. To the pre-emulsions described in the subsequent examples an amount of ethylene dichloride was added corresponding to the amount of monomer added in the second step. This corresponds to an amount of ethylene dichloride of about 800 ml/1000 g H₂O, i.e. the same amount as used when checking the examples described in DAS 2501630. Centrifugation experiments as described above showed that the pre-emulsions prepared as described in the present examples absorbed >80% of added ethylene dichloride.

According to said DAS it would also be necessary to use relatively much water during the homogenization, >20%, preferably >35 to 100% of the total amount of water. This is caused by the fact that large amounts of the partly water-soluble solvent are used.

In the present process the initiators may either be emulsified in the first step without addition of any other organic material or with addition of Substance I as described above. If an additive is used, this is as mentioned above, a liquid water-insoluble Substance I which in contrast to the partly water-soluble additives disclosed in DAS 2501630, is capable of increasing the swelling capacity of the pre-emulsion prepared in the first step when the amount of initiator is the same. The fact that Substance I is a liquid, water-insoluble material has the effect that even with the highest disclosed total amount of initiator and Substance I=7:100 based on the total amount of water, it is possible to use much less water in step 1, for instance <20% of the total amount of water, and nevertheless obtain a stable emulsion. With the ordinary amount of initiator and optionally Substance I of 5–20g/1000 g of H₂O in the final latex, it is sufficient to employ from 10 to 100 g of H₂O during the preparation of pre-emulsion, which has the effect that one saves time and can possibly use a smaller emulsification equipment for preparing the pre-emulsion and nevertheless obtain the same capacity for preparing final latex.

The pre-emulsion prepared in the first step may be considered as a form of seed particles with an exceptional swelling capacity compared to ordinary seed of polymer particles. It is an obvious modification of the method described above that it is possible to mix the "seed" of initiator with one or more other seeds before addition of monomer in the second step. The use of mixed seeds is well known in the literature as a way of adjusting the properties of the final latex or the dry polymer prepared from the latex. Such a second seed may consist of polymer particles or may be another emulsion of Substance I. In both cases the second seed may or may not contain initiator.

Addition of a second seed which does not contain initiator is possible in the case when a transport of radicals into and out of the particles takes place. This is especially the case with monomers such as vinylchloride and vinyl acetate, where this transport has been ascribed to the chain transfer to monomer producing radicals which may desorb from the particles. In this case even particles or droplets without any radicals will acquire radicals by absorption of monomer radicals which are produced in the particles of the first seed (i.e. the initiator) during polymerization. Thus, polymerization will also take place in the second seed, although at a slower rate than in the first seed.

EXAMPLE 1

100 ml of H₂O, 0.5 g of Na-laurylsulphate, 10 g of dioctanoyl peroxide (Perkadox SE 8) were homogenized at about 30° C. in a two-stage homogenizer from Manton Gaulin.

After the homogenization, the emulsion was transferred to an autoclave at 25°–30° C., and 900 ml of H₂O and 5.5 g of Na-laurylsulphate were added. Then, 950 g of vinyl chloride were added, and after stirring for 30 minutes at 25°–30° C. the temperature was raised to 50° C., and polymerization was carried out for 6 hours to about 90% conversion. The latex formed contained particles in the range 0.4–2 μm and the solids content was 46%.

EXAMPLE 2

100 ml of H₂O, 0.5 g of Na-laurylsulphate, 5 g of dioctanoyl peroxide (Perkadox SE 8) and 5 ml of hexadecane were homogenized as described in example 1. After the homogenization the emulsion was transferred to an autoclave at 25°–30° C., and 900 ml of H₂O and 5.5 g of Na-laurylsulphate were added. Then, 950 g of vinyl chloride were added, and after stirring for 30 minutes at 25°–30° C., the temperature was raised to 50° C., and polymerization was carried out for 8.5 hours to about 90% conversion. The latex formed contained particles in the range 0.3–1.5 μm, and the solids content was 46%.

EXAMPLE 3

100 ml of H₂O, 0.5 g of Na-laurylsulphate, 10 g of dioctanoyl peroxide (Perkadox SE 8) were homogenized as described in example 1. After the homogenization, the emulsion was transferred to an autoclave at 25°–30° C. and 900 ml of H₂O and 5.5 g of Na-laurylsulphate were added. Then 600 g of styrene were added, and after stirring for 30 minutes at 25°–+° C., the temperature was raised to 70° C., and polymerization was carried out to complete conversion. The latex formed contained particles in the range 0.3–1.2 μm.

EXAMPLE 4

100 ml of H₂O, 0.5 g of Na-laurylsulphate, 10 g of dioctanoyl peroxide (Perkadox SE 8) and 10 g of hexadecane were homogenized as described in example 1. After the homogenization the emulsion was transferred to an autoclave at 25°–30 ° C., and 900 ml of H₂O and 5.5 g of Na-laurylsulphate were added. Then 600 g of styrene were added, and after stirring for 30 minutes at 25°–30° C., the temperature was raised to 70° C., and polymerization was carried out to complete conversion. The latex formed contained particles in the range 0.2–0.8 μm.

EXAMPLE 5

100 ml of H₂O, 0.5 g of Na-laurylsulphate, 5 g of didecanoyl peroxide (Perkadox SE 10) and 15 ml of dioctyladipate were homogenized at 30°–35° C. as described in example 1. After the homogenization the emulsion was transferred to an autoclave at about 30° C., and 900 ml of H₂O and 5.5 g of Na-laurylsulphate were added. Then 950 g of vinylchloride were added, and after stirring for 30 minutes at about 30° C., the temperature was raised to 50° C., and polymerization was carried out for 8.5 hours to about 90% conversion. The latex formed contained particles in the range 0.3–1.5 μm and the solids content was 46%.

EXAMPLE 6

4 g of a mixture of a nonionic emulsifier, nonyl-phenyl-polyoxyethylene glycol, with an ethylene oxide chain of 5 to 10 chain units were dissolved in 10 g of dioctanoyl peroxide at 25° C. 50 ml of H₂O containing 0.5 g of Na-lauryl sulphate were added gradually under stirring at 500 rpm. to this mixture. After addition of the water the stirring was continued at the same rate for 10 minutes at 25° C. The emulsion of dioctanoyl peroxide which was formed by this process was transferred to an autoclave and 950 ml of H₂O and 3,5 g of Na-laurylsulphate were added. Then 750 g of vinyl chloride were added, and after stirring for 60 minutes at 25° C. the temperature was raised to 50° C. and polymerization was carried out to complete the conversion. The latex formed contained particles in the range 0.5–2.5 μm.

EXAMPLE 7

The procedure was the same as in example 6, with the exception that in this case the nonionic emulsifier was dissolved in a mixture of 9 g of dioctanoyl peroxide and 1 g of hexadecane. The final latex contained particles in the range 0.3–2.0 μm.

I claim:

1. A process for the preparation of a polymer latex which comprises:
   a. homogenizing water, an emulsifier and an initiator or mixture thereof having a water solubility of $<10^{-2}$ g/l in the presence or absence of a solvent, said homogenisation being at a temperature above the melting point of the initiator or mixture thereof in the absence of the solvent,
   said solvent having a water solubility of $<10^{-2}$ g/l H₂O and a molecular weight of less than 5,000 and which forms a solution with said initiator or mixture thereof at the homogenisation temperature,
   whereby an emulsion containing fine droplets of initiator is formed;
   b. adding water and a polymerizable monomer with or without additional emulsifier to the emulsion of a., whereby a substantial portion of said monomer diffuses into said initiator droplets; and,
   c. initiating the polymerization of said monomer by heating.

2. The process according to claim 1, wherein when oil-soluble initiators without the presence of solvent are used in step a., an amount of initiator from 0.5:1000–2:100, based on the total amount of water in the final latex, by weight, is used.

3. The process according to claim 1, wherein in addition to the initiator in step a., said solvent is used in an amount in proportion to water in the final latex of 0.5:1000–5:100 and in an amount in proportion to initiator of from 0.05:1–10:1, by weight.

4. The process according to claim 1, wherein there is employed an anionic, cationic or non-ionic emulsifier in a total amount of 1:1000 to 5:100, based on the total amount of water in the final latex, by weight, and adding this emulsifier partly or entirely in step a., and adding any remainder of emulsifier in the step b.

5. The process according to claim 1, wherein the initiator or initiator mixture has a water solubility of $<10^{-3}$ g/l H₂O.

6. The process according to claim 1, wherein the initiator or initiator mixture has a water solubility of $<10^{-4}$ g/l H₂O.

7. The process according to claim 1 wherein said solvent has a water solubility of $<10^{-3}$ g/l H₂O.

8. The process according to claim 1 wherein said solvent has a water solubility of $<10^{-4}$ g/l H₂O.

9. The process according to claim 1 wherein said solvent has a molecular weight of <500.

10. The process according to claim 1 wherein the initiator droplets are less than 0.2 microns.

11. The process according to claim 12 wherein the initiator droplets are less than 0.1 microns.

12. The process according to claim 1 wherein the initiator is one or more of dioctanoyl peroxide, didecanoyl peroxide, dioctanoyl-peroxydicarbonate, didecyl-peroxydicarbonate, or didodecyl-peroxydicarbonate.

13. The process according to claim 1 wherein the initiator is lauroyl peroxide or dicetylperoxydicarbonate.

14. The process according to claim 1 wherein the monomer employed in step b. is vinyl chloride.

15. The process according to claim 4 wherein a part of the emulsifier is added in step b.

* * * * *